United States Patent Office

2,940,979
DERIVATIVES OF THIOPYRANOTHIAZOLES

Robert H. Sprague, Shaker Heights, Ohio, assignor to Horizons Incorporated, Cleveland, Ohio, a corporation of New Jersey No Drawing. Filed Sept. 29, 1958, Ser. No. 763,786

5 Claims. (Cl. 260—302)

This invention relates to a new class of chemical compounds useful as accelerators for the vulcanization of rubber, as fungicides or insecticides and as pharmaceuticals, including utility as analgetics, antitubercular drugs and tranquilizers. More specifically it relates to a new thiazole: 6,7-dihydro-4-H-thiopyrano(4,3d)thiazole and to a series of derivatives thereof which are particularly useful as accelerators for the vulcanization of rubber and which may also be useful as pharmaceuticals.

A vast amount of research has been reported on the vulcanization of rubber and rubber-like materials. Among the classes of compounds which are described in the literature are those based on thiazole derivatives such as 2-mercaptobenzothiazole or 2-mercaptotetrahydrobenzothiazole or 2-aminobenzothiazole; or sulfenamides and sulfenimides derived from the mercaptothiazoles and aminothiazoles respectively. It has also been reported that the partially reduced analogues of the above materials such as the tetrahydrobenothiazole derivatives are useful for these purposes.

Other related compounds such as the thiazoline-2-ones have recently been described as useful as analgetics. Still other related compounds, namely the thiazolines or oxazolines have been suggested as antitubercular drugs.

I have now found that the introduction of a substituent into the saturated ring fused to the thiazole ring and particularly the introduction of sulfur in place of one of the carbons, results in compounds having improved utility as vulcanization accelerators, or insecticides or fungicides, or as pharmaceuticals of the types indicated.

Specifically, one aspect of the present invention concerns a new thiazole ring system derived from tetrahydro-1-thio-4-pyrone and new compounds containing this new ring system.

The following examples are intended to be illustrative of the present invention and are by no means exhaustive of the useful derivatives obtainable within the intended scope of the invention.

*Example 1.*—3-bromo-1-thiotetrahydro-4-pyrone (prepared by the method of R. H. Sprague, J. Am. Chem. Soc., 79, 2281 (1957)) may be condensed with ammonium dithiocarbamate by refluxing the mixture in ether solution, giving 2-mercapto-6,7-dihydro-4-H-thiopyrano(4,3d)thiazole.

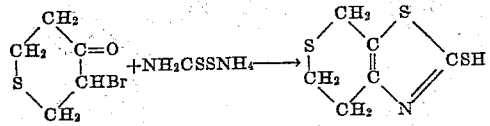

*Example 2.*—A mixture of the mercaptothiazole prepared by the method of Example 1 with cyclohexylamine and aqueous sodium hydroxide solution may be oxidized with a solution of iodine in potassium iodide, giving N-cyclohexyl-(6,7-dihydro-4-H - thiopyrano(4,3d)thiazolyl-2)sulfenamide.

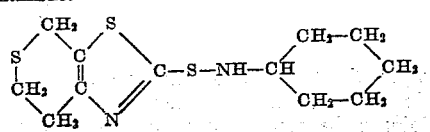

In the reaction, primary amines such as isopropylamine, butylamine, and the like, secondary amines and tertiary amines may each be substituted for the cyclohexylamine given by way of example.

*Example 3.*—3-bromo-1-thiotetrahydro-4-pyrone may be condensed with thiourea by heating the materials together on the steam bath. The product may be recrystallized from alcohol, giving 2-amino-6,7-dihydro-4-H-thiopyrano(4,3d) thiazole hydrobromide from which the free base may be prepared by treatment with $K_2CO_3$ solution and extraction with ether.

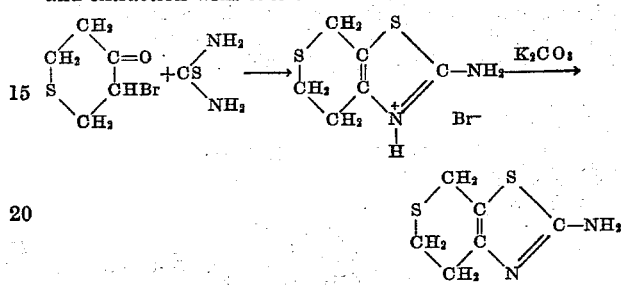

*Example 4.*—The 2-amino-6,7-dihydro-4-H-thiopyrano (4,3d)thiazole may be alkylated by methyl iodide in alcohol solution in the presence of alkali, giving 3-methyl-2-imino-6,7-dihydro-4-H-thiopyrano(4,3d)thiazoline.

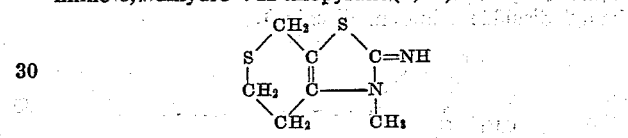

The methyl iodide in the above reaction may be replaced by a variety of alkylating agents—such as ethyliodide, ethylsulfate, butylbromide, benzyl bromide, yielding the corresponding N-alkylthiazoline derivative.

*Example 5.*—The 3 - methyl - 2-imino-6,7-dihydro-4-H-thiopyrano(4,3d)thiazoline may also be prepared by condensing 3-thiocyano-1-thiotetrahydro-4-pyrone (prepared from the bromo ketone and barium thiocyanate, using the procedure of de Stevens, et al., J. Am. Chem. Soc., 79, 5263 (1957)) with methylamine in alcohol solution. The product is identical with that obtained in Example 4.

*Example 6.*—The iminothiazole produced by the methods of Examples 4 or 5 may also be chlorinated with NaOCl in cold $Na_2CO_3$ solution to 2-chloro-imino-3-methyl-6,7-dihydro-4-H-thiopyrano(4,3d)thiazoline.

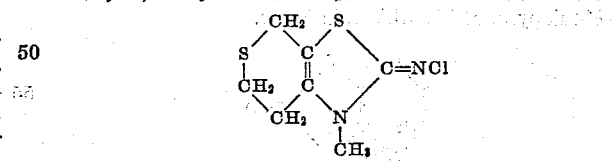

The chloroimino compound thus obtained may be reacted with mercaptides—such as sodium phenylmercaptide, sodium-n-butylmercaptide, sodium cyclohexyl mercaptide, etc.—to give sulfenimides useful as vulcanization accelerators. For example, addition of a cold solution of NaOCl in water to a stirred mixture of 3-methyl-2-imino-6,7-dihydro-4-H-thiopyrano(4,3d) thiazoline and an alkaline solution of cyclohexylmercaptan, followed by heating rapidly to 100° C. gives cyclohexyl-(3-methyl-6,7 - dihydro - 4 - H - thiopyrano(4,3d)thiazoline-2) sulfenimide.

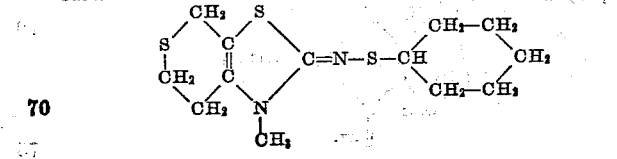

*Example 7.*—The 2-mercapto-6,7-dihydro-4-H-thiopyrano (4,3d)thiazole prepared as in Example 1 may be oxidized in aqueous sodium hydroxide solution with chlorine gas to give 2,2'-dithio-bis(6,7-dihydro-4-H-thiopyrano(4,3d) thiazole).

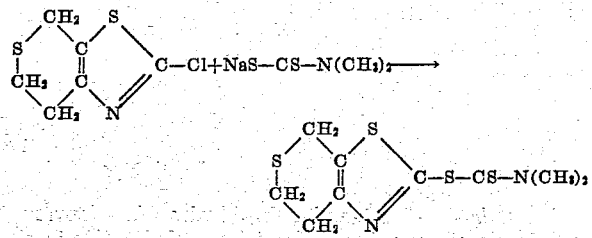

*Example 8.*—Chlorinating the product of Example 1 in acetic acid solution produces 2-chloro-6,7-dihydro-4-H-thiopyrano(4,3d)thiazole which may be condensed with sodium dimethyldithiocarbamate in aqueous sodium hydroxide, giving dimethyldithiocarbamyl-2-(6,7-dihydro-4-H-thiopyrano(4,3d)thiazolyl) sulphide.

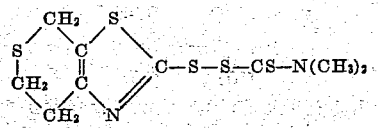

*Example 9.*—Oxidation of the above monosulfide with aqueous hydrogen peroxide solution yields the thiocarbamyl disulfide (thiuram disulfide).

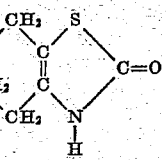

*Example 10.*—3-bromo-1-thiotetrahydro-4-pyrone may be condensed with ethyl xanthamidate in ethyl alcohol solution, giving 6,7-dihydro-4-H-thiopyrano(4,3d)thiazolin-2-one.

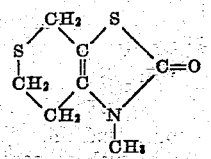

*Example 11.*—The product of Example 10 may be alkylated with methyl iodide, giving 3-methyl-6,7-dihydro-4-H-thiopyrano(4,3d)thiazolin-2-one.

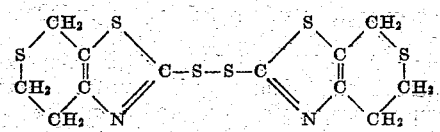

The methyl iodide used in this reaction may be replaced by ethyl iodide, propyl iodide, butyl bromide, cyclohexyl bromide, diethyl sulfate, benzyl bromide, etc., giving the corresponding N-substituted compounds.

*Example 12.*—3-bromo-1-thiotetrahydro-4-pyrone may be condensed with diphenyl thiourea by refluxing the components in absolute ethanol for 6 hours, giving 3-phenyl - 2 - phenylimino - 6,7 - dihydro-4-H-thiopyrano-(4,3d) thiazoline.

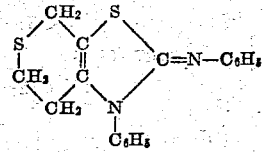

Diethylthiourea, dicyclohexylthiourea, and other substituted thioureas may be employed in place of the diphenylthiourea given by way of example to produce the corresponding thiazoline derivatives.

The foregoing examples illustrate the several classes of useful compounds which may be prepared from a new thiazole ring system. The following examples list several methods of preparing substituted haloketones, leading to substituted versions of the new thiazole described above.

*Example 13.*—3-bromo-1-thiotetrahydro-4-pyrone may be reacted with secondary amines such as diethylamine, for example, giving 3-diethylamino-1-thiotetrahydro-4-pyrone. This may then be brominated, giving a haloketone which may be used in any of the above syntheses to prepare new thiazole derivatives. The sequence of reactions is outlined below:

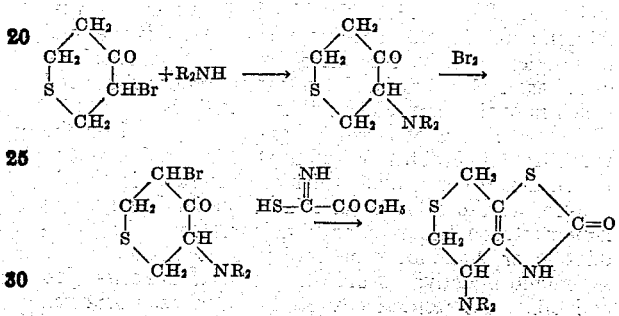

Secondary amines, useful in the above reaction, are dialkylamines, piperidine, morpholine, pyrrolidine, etc.

*Example 14.*—The Mannich reaction may be employed with tetrahydro-1-thio-4-pyrone for the preparation of new thiazole derivatives as outlined below:

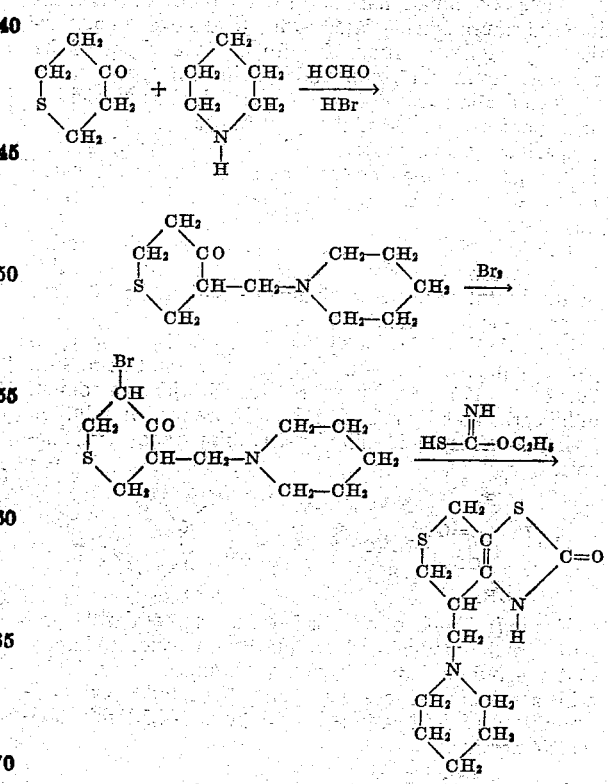

*Example 15.*—Compounds similar to the products from Example 14, but having a lengthened polymethylene chain joining the secondary amino group to the benzothiazoline ring at position 4, may be prepared by the following series of reactions:

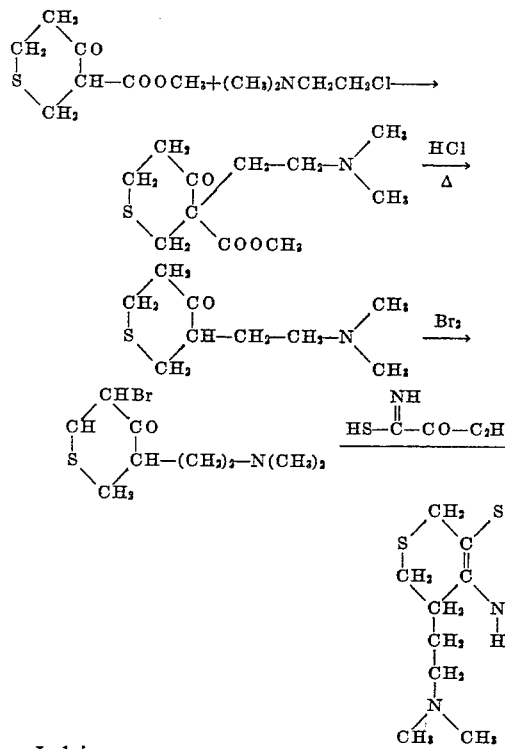

I claim:
1. A thiazole having the general formula selected from the group consisting of:

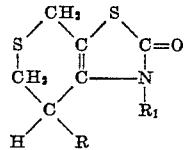 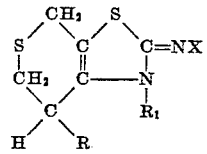

and

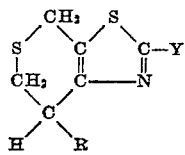

wherein R is a monovalent radical selected from the group consisting of hydrogen, diethylamino, β-dimethylaminoethyl, and piperidinomethyl; $R_1$ is a monovalent radical selected from the group consisting of hydrogen, methyl, ethyl, propyl, butyl, cyclohexyl, benzyl and phenyl; X is a member selected from the group consisting of hydrogen, chlorine, phenylmercapto, n-butylmercapto, cyclohexylmercapto, cyclohexyl, and phenyl; and Y is a member selected from the group consisting of —SH; —S—NH-isopropyl, —S—NH-butyl, —S—NH-cyclohexyl,

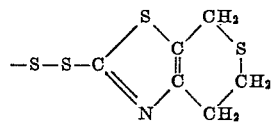

—S—CS—N(CH$_3$)$_2$, —S—S—CS—N(CH$_3$)$_2$, —NH$_2$ and chlorine.

2. The compound 2-mercapto-6,7-dihydro-4-H-thiopyrano(4, 3d) thiazole.

3. The compound 3 methyl-2-imino-6,7-dihydro-4-H-thiopyrano (4, 3d) thiazoline:

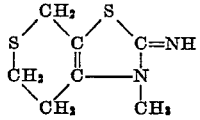

4. The compound

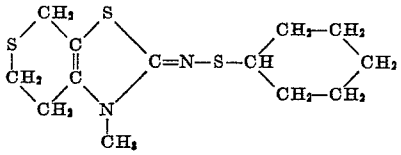

5. The compound

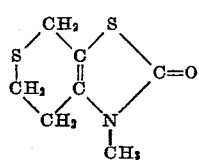

References Cited in the file of this patent
Erlenmeyer et al.: Chem. Abstracts, vol. 42, col. 4165 (1948).